(12) United States Patent
Bellamy-Booth

(10) Patent No.: US 6,458,055 B1
(45) Date of Patent: Oct. 1, 2002

(54) REVERSIBLE TENSIONER

(75) Inventor: Colin Bellamy-Booth, West Mersey (GB)

(73) Assignee: Litens Automotive, Woodbridge (CA)

( * ) Notice: Subject to any disclaimer, the term of this patent is extended or adjusted under 35 U.S.C. 154(b) by 0 days.

(21) Appl. No.: 09/547,106

(22) Filed: Apr. 11, 2000

Related U.S. Application Data

(60) Provisional application No. 60/128,736, filed on Apr. 12, 1999.

(51) Int. Cl.[7] ............................................. F16H 7/12
(52) U.S. Cl. ...................................... 474/135; 474/117
(58) Field of Search ............................... 474/135, 101, 474/133, 117, 138, 136, 112

(56) References Cited

U.S. PATENT DOCUMENTS

| | | |
|---|---|---|
| 3,921,793 A | 11/1975 | Hutchinson |
| 4,270,906 A | 6/1981 | Kraft et al. .................. 474/135 |
| 4,464,146 A | 8/1984 | Arthur |
| 4,473,362 A | 9/1984 | Thomey et al. |
| 4,583,962 A | 4/1986 | Bytzek et al. |
| 4,661,087 A * | 4/1987 | Henderson .................. 474/135 |
| 4,808,148 A | 2/1989 | Holtz |
| 4,813,915 A * | 3/1989 | Kotzab ........................ 474/133 |
| 4,917,655 A | 4/1990 | Martin |

FOREIGN PATENT DOCUMENTS

EP      0 482 781 A1    4/1992

OTHER PUBLICATIONS

International Search Report re: PCT/CA00/00382.

* cited by examiner

Primary Examiner—Thomas R. Hannon
Assistant Examiner—Timothy McAnulty
(74) Attorney, Agent, or Firm—Pillsbury Winthrop LLP

(57) ABSTRACT

A belt tensioner mounted on mounting structure in normal and reverse modes which comprises a hub structure. An arm structure is pivotally mounted on the hub structure for pivotal movements with respect thereto about a pivot axis central to the hub structure between first and second limiting positions. A belt-engaging pulley is rotatably mounted on the arm structure for rotational movement about a rotational axis parallel with the pivotal axis. A spring system is provided for resiliently biasing the arm structure away from the first limiting position and toward the second limiting position. The hub structure includes a central opening extending axially therethrough configured to allow a mounting bolt to extend therethrough and into secured relation to the mounting structure. The hub structure includes a normal mode mounting plate on one axial end thereof which engages the mounting structure when the mounting bolt is secured therein as aforesaid. The normal mode mounting plate includes normal mode locator structure which cooperates with locator structure on the mounting structure and the mounting bolt to maintain the hub structure in a normal mode position thereon enabling normal mode orientation of the pulley with respect to an endless belt to be tensioned, wherein the spring system resiliently biases the pulley toward the second position into tensioning relation to the belt. The hub structure also includes a reverse mode mounting plate at an opposite axial end thereof having reverse mode locator structure thereon. The reverse mode mounting plate and locator structure are configured to engage and cooperate with the mounting structure and the mounting bolt to maintain the hub structure in a reverse mode enabling reverse mode orientation of the pulley with respect to an endless belt to be tensioned, wherein the spring system resiliently biases the pulley toward the second position into tensioning relation to the belt.

12 Claims, 2 Drawing Sheets

REVERSIBLE TENSIONER

This application claims the benefit of U.S. Provisional Application No. 60/128,736, filed Apr. 12, 1999.

This invention relates to belt tensioners and more particularly to belt tensioners of the type utilized in automotive vehicles.

BACKGROUND OF THE INVENTION

Belt tensioners of the type herein contemplated are exemplary of those used to tension the serpentine belt drive of the engine. Other types of tensioners contemplated are timing belt tensioners. Belt tensioners have been utilized on a wide variety of serpentine belt arrangements. In general, the usual practice has been to customize the belt tensioner for each particular vehicular set-up. More and more, the same engine is being used in different vehicular models where the operational requirements for the belt tensioner is the same but the mounting requirements are completely different. Heretofore, in situations of this type, customization was still practices. There is always a need, particularly when dealing with automotive parts, to make them more cost effective.

SUMMARY OF THE INVENTION

It is an object of the present invention to fulfill the above need. The invention is based upon the underlying concept that the cost-effectiveness can be achieved in circumstances where the installation of the same engine in different vehicular models presents different mounting requirements by making a single belt tensioner having multiple mounting capabilities than to make different belt tensioners to accommodate the different mounting requirements. In accordance with the principles of the present invention, the objective of enhanced cost effectiveness is achieved by providing a belt tensioner mounted on mounting structure in normal and reversible modes which comprises a hub structure. An arm structure is pivotally mounted on the hub structure for pivotal movements with respect thereto about a pivot axis central to the hub structure between first and second limiting positions. A belt-engaging pulley is rotatably mounted on the arm structure for rotational movement about a rotational axis parallel with the pivotal axis. A spring system is provided for resiliently biasing the arm structure away from the first limiting position and toward the second limiting position. The hub structure includes a central opening extending axially therethrough configured to allow a mounting bolt to extend therethrough and into secured relation to the mounting structure. The hub structure includes a normal mode mounting plate on one axial end thereof which engages the mounting structure when the mounting bolt is secured therein. The mounting plate includes a normal mode locator structure which cooperates with locator structure on the mounting structure to enable normal mode orientation of the pulley with respect to an endless belt to be tensioned, wherein the spring system resiliently biases the pulley toward the second position into tensioning relation to the belt. The hub includes a reversible mode mounting plate at an opposite axial end thereof which has a reversible locator structure comparable to the normal locator structure. The reversible mode mounting plate and locator structure engages mounting structure to enable reverse orientation of the pulley with respect to an endless belt to be tensioned, wherein the spring system resiliently biases the pulley toward the second position into tensioning relation to the belt.

DETAILED DESCRIPTION OF THE PREFERRED EMBODIMENT OF THE INVENTION

Figure 1:
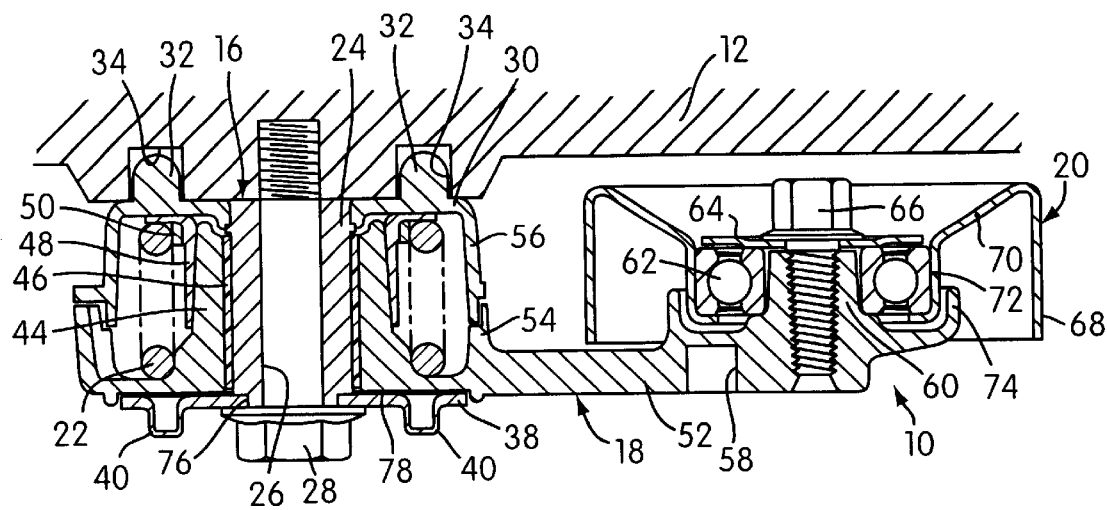
FIG. 1 is a sectional view taken along the pivotal and rotational axis of a belt tensioner embodying the principles of the present invention showing the same mounted in a normal mode on a mounting structure.
Figure 2:
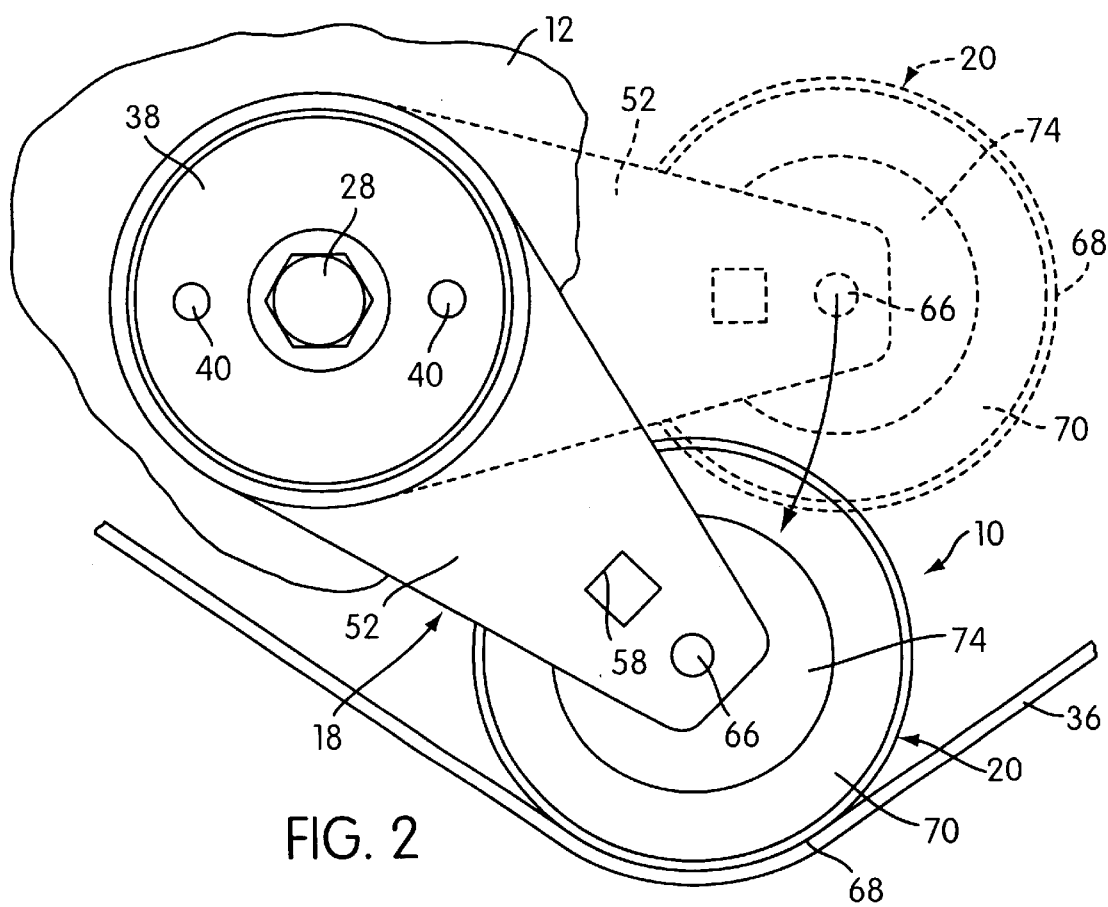
FIG. 2 is a side elevational view showing the belt tensioner in a normal mode orientation in tensioning relation to a belt showing the same in an extended second position thereof in solid lines and a normal mode first position in dotted lines.
Figure 3:
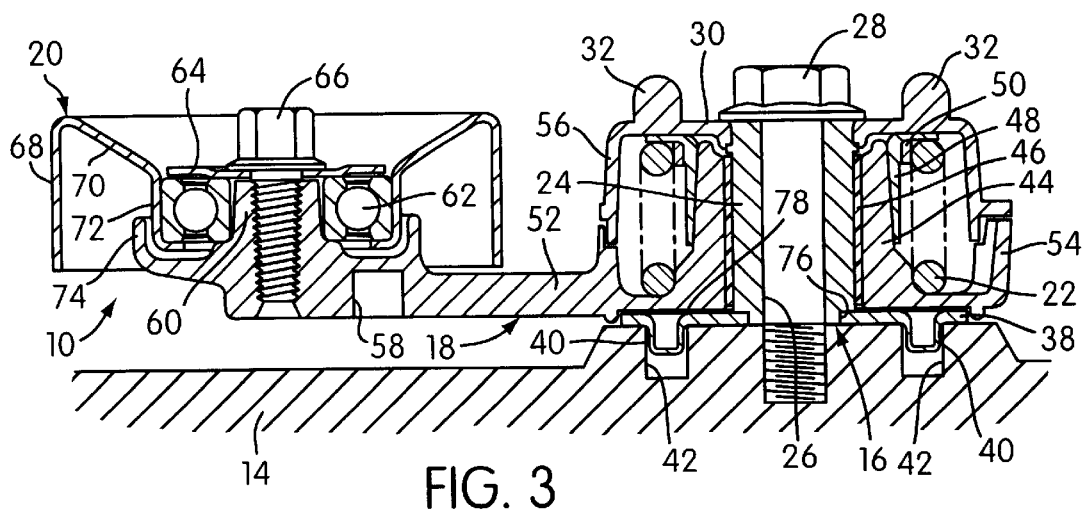
FIG. 3 is a view similar to FIG. 1 showing the belt tensioner mounted in a reverse mode position.
Figure 4:
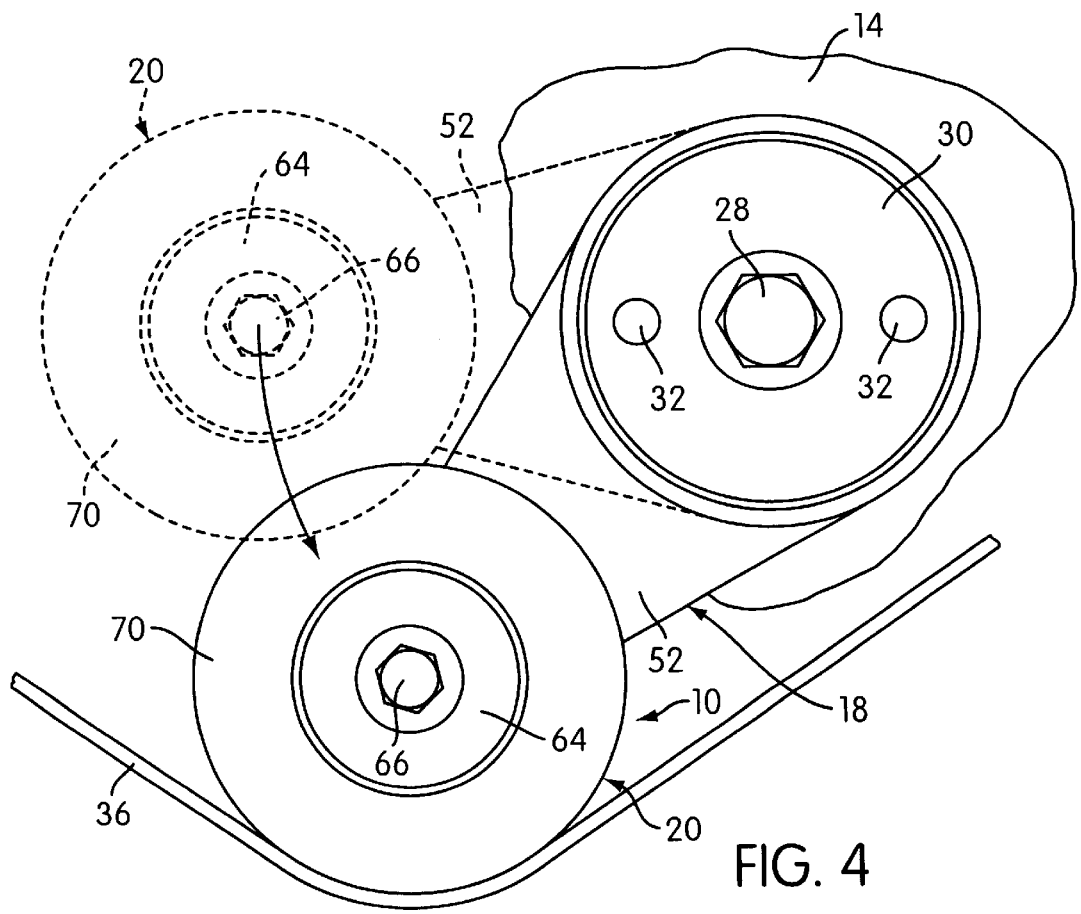
FIG. 4 is a view similar to FIG. 2 showing the belt tensioner in a reverse mode orientation.

Referring now more particularly to the drawings, there is shown therein a belt tensioner, generally indicated at 10, which embodies the principles of the present invention. The belt tensioner 10 is operable to be mounted on different mounting structures, generally illustrated in FIGS. 1 at 12 and 3 at 14 in a normal mode as shown in FIGS. 1 and 2 and in a reverse mode as shown in FIGS. 3 and 4.

The belt tensioner comprises, in general, a hub structure, generally indicated at 16, and an arm structure, generally indicated at 16, pivotally mounted on the hub structure 16 for pivotal movements with respect thereto about a pivot axis central to said hub structure between first and second limiting positions. A belt-engaging pulley, generally indicated at 20, is rotatably mounted on the arm structure for rotational movement about a rotational axis parallel with the pivotal axis and a spring system in the form of a torsion coil spring 22 is mounted between the hub structure 16 and the arm structure 18 for resiliently biasing the arm structure 18 away from the first limiting position and toward the second limiting position. The hub structure 16 includes a cylindrical hub member 24 having a central opening 26 extending axially therethrough configured to allow a mounting bolt 28 to extend therethrough and into secured relation to the mounting structure 12 or 14.

The hub structure 16 also includes a normal mode mounting plate 30 which is fixed on one axial end of the hub member 24. As best shown in FIGS. 1 and 2, the normal mode mounting plate is constructed and arranged to engage the mounting structure 12 when said mounting bolt 28 is threadedly secured therein. The normal mode mounting plate 30 includes normal mode locator structure in the form of two diagonally spaced projecting knobs 32. The knobs 32 are configured to cooperate locator structure in the form of mating recesses 34 on the mounting structure 12 and the mounting belt 28 to maintain the hub 16 in a normal mode position thereon, enabling normal mode orientation of pulley 20 with respect to an endless belt 36 to be tensioned. This normal mode orientation 20 is shown in FIG. 1 wherein the spring 22 resiliently biases the pulley toward and near the second position into tensioning relation to the belt 36.

In accordance with the principles of the present invention, the hub structure 16 also includes a reverse mode mounting plate 38 at an opposite axial end of the hub member 24 having reverse locator structure 40 thereon.

The reverse mode mounting plate 38 and locator structure 40 are configured to engage and cooperate with the mounting structure 14 and the mounting bolt 28 to maintain the hub structure 16 in a reverse mode position, enabling reverse mode orientation of the pulley 20 with respect to the endless belt 36 to be tensioned, wherein the torsion spring 22 resiliently biases the pulley 20 toward the second position into tensioning relation to the belt 36.

The tensioner 10, as shown, is a proportionally dampened tensioner of the type disclosed in U.S. Pat. No. 4,473,362, the disclosure of which is hereby incorporated by reference into the present specification. As shown, the arm structure 18 includes a hub portion 44 which is journaled on the hub member 24, by a suitable bearing sleeve 46. A flanged damping sleeve 48 is mounted on the exterior periphery of the arm hub portion 44 with its flange in engagement with the inner surface of the normal mode mounting plate 30. A force transmitting ring 50 is mounted in surrounding relation to the damping sleeve 48 adjacent its flange and in radial abutment with an adjacent volute of the torsion spring 22. As the spring 22 expands and contracts during the operational movements of the arm structure 18, a proportional force is transmitted from the spring 22 to damping sleeve 48 through the ring 50. The proportional spring force is reflected in a proportional sliding frictional damping force which controls the movements of the arm structure 18 with respect to the fixed hub structure 16. It will be understood that, while a proportionally damped tensioner 10 is exemplary disclosed, the normal mode-reverse mode aspect of the present invention could be applied to any other known type of tensioner.

The arm structure 18 also includes an arm portion 52 which is integral with one end of the hub portion 44 and extends radially outwardly therefrom. The circular-shaped inner section of the arm portion 52 is formed with a radially inwardly projecting annular flange portion 54 having a free end which cooperates with the free end of an axially inwardly extending annular flange portion 56 formed integrally on the outer periphery of the normal mode mounting plate 30. The flange portions 54 and 56 serve to substantially enclose the spring 22.

The arm portion 52 of the arm structure 18 includes a normal mode lever tool receiving recess 58 in the surface thereof adjacent the reverse mode mounting plate 38. Recess 58 is thus positioned, when the tension is in a normal mode, to receive a level tool which enables the installer to more easily move the arm structure 18 into its first position against the bias of spring 22 when installed on tensioning relation to the serpentine belt 36.

The arm structure 18 also includes an integral shaft portion 60 which extends axially inwardly from the outer end of the arm portion 52. The exterior periphery of the shaft portion 60 has the inner race of a ball bearing assembly 62 fixed thereon as by a washer 64 and a headed bolt 66 suitably threadedly engaged within the shaft portion 60. The head of the bolt 66 serves as a reverse mode lever tool receiving element which aids in installation when the belt tensioner 10 is in the reverse mode.

The pulley 20 is shown as being made of sheet metal so as to provide an outer annular wall 68 having smooth belt engaging peripheral surface. It will be understood that the pulley wall 68 could be configured to present a poly groove engaging surface or the like. As shown, the pulley 20 includes a circular wall 70 extending radially and axially inwardly from one end of the outer annular wall 68 which terminates in an integral hub portion 72 engaged with the outer race of the ball bearing assembly 62. Finally, it will be noted that the arm structure 18 includes an integral cup shaped portion 74 which generally surrounds the inner end of the ball bearing.

It can be seen that all of the hub structure 16, arm structure 18 and pulley 20 are contained between two planes coincident with the outer surfaces of the normal mode and reverse mode mounting plates 30 and 38. In this way, the belt tensioner 10 can be mounted in a normal mode with the outer surface of the normal mode mounting plate engaging a mounting structure 12 as shown in FIGS. 1 and 2. In this normal mode, mounting bolt 28, when threadedly engaged within the mounting structure 12, fixedly secures the hub structure 16 to the mounting structure with the engagement of normal mode locator knobs 32 within the recesses 34 positively preventing pivotal movement about the axis of the mounting bolt 28.

By the same token, the belt tensioner 10 can be mounted in a reverse mode. In this mode, the mounting bolt serves to fixedly engage the outer surface of the reverse mode mounting plate in engagement with a mounting structure 14 as shown in FIGS. 3 and 4. Here again, the reverse mode locator knobs 40 engaged within recesses 42 positively prevents pivotal movement about the axis of the mounting bolt 28.

It will be noted that the reverse mode mounting plate 38 has its inner marginal edge engaged with an annular groove 76 formed in the end of the hub member and that the head of the mounting bolt engages over the inner marginal edge of the plate 38 to positively retain the exposed plate 38 in position when the belt tensioner 10 is in a normal mode as shown in FIG. 1. Preferably, a thrust bearing 78 is mounted between the inner surface of the plate 38 and the opposed surface of the arm portion 53 of the arm structure 18.

What is claimed is:

1. A belt tensioner operable to be mounted on mounting structure in normal and reverse modes comprising a hub structure, an arm structure pivotally mounted on said hub structure for pivotal movements with respect thereto about a pivot axis central to said hub structure between first and second limiting positions, a belt-engaging pulley rotatably mounted on said arm structure for rotational movement about a rotational axis parallel with said pivotal axis, a sing system for resiliently biasing said arm structure away from said first limiting position and toward said second limiting position, said hub structure including a central opening extending axially therethrough configured to allow a mounting bolt to extend therethrough and into secured relation to the mounting structure, said hub structure including a normal mode mounting plate on one axial end thereof constructed and arranged to engage the mounting structure when said mounting bolt is secured therein as aforesaid, said normal mode mounting plate including normal mode locator structure configured to cooperate with locator structure on the mounting structure and the mounting bolt to maintain the hub structure in a normal mode position thereon enabling normal mode orientation of said pulley with respect to an endless belt to be tensioned, wherein said spring system resiliently biases said pulley toward said second position into tensioning relation to the belt, said hub structure also including a reverse mode mounting plate at an opposite axial end thereof having reverse mode locator structure thereon, said reverse mode mounting plate and locator structure being configured to engage and cooperate with the mount structure and the mounting bolt to maintain the hub structure in a reverse mode position thereon enabling reverse mode orientation of said pulley with respect to an endless belt to be tensioned, wherein said spring system resiliently biases said pulley toward said second position into tensioning relation to the belt said reverse mode mounting plate being retained in engagement with said hub structure by the mounting bolt.

2. The belt tensioner as defined in claim 1 wherein said arm structure includes a normal mode tool-receiving recess facing outwardly in the axial direction of said normal mode mounting plate constructed and arranged to receive a lever tool-enabling an operator to more easily move said arm structure into the first position thereof against the bias of said spring system for purposes of installation.

3. The belt tensioner as defined in claim 2 wherein said arm structure includes a shaft portion extending axially from an outer end thereof, said pulley being positioned and journaled on said shaft portion and retained in position thereon by a headed bolt threadedly engaged in said shaft, said bolt having a head disposed within the periphery of said pulley in a position to be engaged by a lever tool when said belt tensioner is in said reverse mode.

4. The belt tensioner as defined in claim 3 wherein said normal mode locator structure comprises a pair of diametrically opposed knobs protruding axially outwardly from said normal mode mounting plate.

5. The belt tensioner as defined in claim 4 wherein said reverse mode mounting plate includes a comparable pair of diametrically opposed knobs protruding axially outwardly from said reverse mode mounting plate.

6. The belt tensioner as defined in claim 1 wherein said normal mode locator structure comprises a pair of diametrically opposed knobs protruding axially outwardly from said normal mode mounting plate.

7. The belt tensioner as defined in claim 1 wherein said reverse mode mounting plate includes a comparable pair of diametrically opposed knobs protruding axially outwardly from said reverse mode mounting plate.

8. The belt tensioner as defined in claim 1 wherein said hub structure includes a cylindrical hub member having opposite axial ends to which said normal mode and reverse mode mounting plates are fixed.

9. The belt tensioner as defined in claim 8 wherein said spring system comprises a torsion coil spring disposed in surrounding relation to said hub member between said normal mode and reverse mode mounting plates.

10. The belt tensioner as defined in claim 9 wherein said normal mode mounting plate includes an annular flange extending generally axially inwardly from an outer peripheral edge thereof, said arm structure having an oppositely directed annular flange disposed in cooperating relation with said mounting plate flange to substantially exteriorly enclose said torsion coil spring.

11. The belt tensioner as defined in claim 9 wherein said hub structure, said arm structure and said pulley are contained within planes coincident with outer oppositely facing mounting structure-engaging planar surfaces of said normal mode and reverse mode mounting plates.

12. The belt tensioner as defined in claim 11 wherein said arm structure includes a portion journaled on said hub member and having a damping sleeve mounted thereon in force transmitting relation to a volute of said torsion coil spring.

* * * * *